US005458318A

United States Patent [19]

Jussila

[11] Patent Number: 5,458,318

[45] Date of Patent: Oct. 17, 1995

[54] DRUM BRAKE

[75] Inventor: Olavi Jussila, Hyvinkää, Finland

[73] Assignee: Kone Oy, Helsinki, Finland

[21] Appl. No.: 136,370

[22] Filed: Oct. 15, 1993

[51] Int. Cl.[6] .............................. B66D 1/48; B66D 5/02; B60T 8/72; F16D 63/00

[52] U.S. Cl. .............................. 254/267; 254/376; 254/378; 242/396.4; 242/396.6; 188/180; 188/68

[58] Field of Search .............................. 254/267, 275, 254/376, 378; 242/396.4, 396.6, 421.4, 383.4, 383; 188/189, 182, 186, 180, 68, 163

[56] References Cited

U.S. PATENT DOCUMENTS

| | | | |
|---|---|---|---|
| 2,351,997 | 6/1944 | Morrill | 188/68 |
| 2,974,752 | 3/1961 | Howard | 188/163 |
| 3,659,686 | 5/1972 | Markley | 188/68 X |
| 4,058,271 | 11/1977 | Ubukata et al. | 242/383.4 |
| 4,513,952 | 4/1985 | Vandelinde | 188/180 X |
| 4,520,998 | 6/1985 | Flaig . | |
| 4,566,674 | 1/1986 | Ebey et al. | 254/376 X |
| 5,127,631 | 7/1992 | Flaig | 254/267 |
| 5,217,208 | 6/1993 | Stephenson | 254/376 X |

FOREIGN PATENT DOCUMENTS

| | | | |
|---|---|---|---|
| 2511995 | 3/1982 | France | 254/267 |

*Primary Examiner*—Daniel P. Stodola
*Assistant Examiner*—Michael R. Mansen

[57] ABSTRACT

A safety mechanism for preventing a cable drum to rotate with overspeed has parallel ratchet wheels which encircle a brake drum. At a periphery of the ratchet wheels are stopping slots wherein a latching pawl is inserted when an overspeed is detected. The slots of the adjacent ratchet wheels are staggered. Thus the braking effect of each ratchet wheel starts at a different point of time.

12 Claims, 1 Drawing Sheet

DRUM BRAKE

BACKGROUND OF THE INVENTION

1. Field of the Invention

The present invention is directed to a safety mechanism for a hoist having a lowering speed limit. The safety mechanism is activated as the speed of the load exceeds the lowering limit by a latch which locks the ratchet wheel which is rotating with the cable drum of the hoist. The ratchet wheel has a brake lining against the cable drum.

2. Description of the Background Art

U.S. Pat. No. 4,520,998 shows a safety mechanism as described above. In this system, the drum is braked with a very high braking force in the beginning of the stopping because the brake linings may get stuck in the drum before the safety mechanism is activated. Therefore the detaching force may have a very high value before the brake lining of the ratchet wheel begins to slide on the surface of the drum. The ropes may also be weakened during over time and therefore it is possible that the ropes may be broken when the braking force is very high. The ropes should bear a force that is needed to decelerate a maximum load from a certain speed within a predetermined distance. The braking moment should not exceed this force in any situation.

SUMMARY OF THE INVENTION

It is an object of this invention to produce a safety mechanism for a hoist which is activated when the lowering speed exceeds a predetermined limit and which will act reliably in all circumstances and will cause only limited braking force also in the beginning of the braking. The force will be essentially constant during the braking period. This problem is solved by the present invention in that the safety mechanism comprises at least two ratchet wheels surrounding a brake drum and being parallel in the axial direction of brake drum. The safety mechanism is hereinafter called also as a drum brake in this specification. Each of said ratchet wheels are lined with a brake lining interposed between a ratchet wheel and said drum. The ratchet wheels are fixed to and rotatable with said brake drum by the frictional force exerted by said brake linings on said brake drum. In order to activate the brake, each of said ratchet wheels are provided at its periphery with at least one stopping slot and at least one of said stopping slots are transferred in the rotation direction of the drum compared to at least one other stopping slot. When activating the drum brake, a latching means is inserted into at least one of said stopping slots thus preventing rotation of the brake drum when said predetermined cable speed limit is exceeded.

In another development of the present invention, each ratchet wheel is comprised of one circular part which is forced on said drum by a screw connecting the ends of said part.

In one further development of the present invention, the latching means is inserted simultaneously to stopping slots of all said ratchet wheels.

In yet another modification of the present invention, the latching means is actuated by an electric trigger.

According to one further modification of the invention, the drum brake comprises identical ratchet wheels and the ratchet wheels are forming a modular structure.

In one modification of the invention, the phase difference between the ratchet wheels is adjustable.

BRIEF DESCRIPTION OF THE DRAWING

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Figure 1:
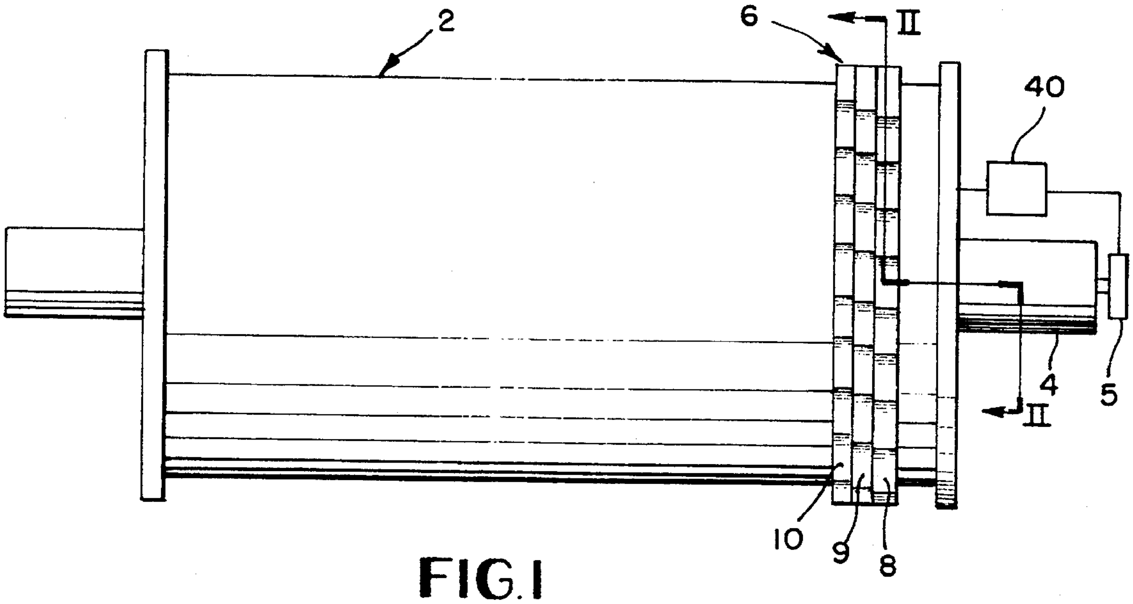
FIG. 1 is a side view of the cable drum wherein the invention is used.

FIG. 1 illustrates a side view of a cable drum 2 of a hoisting device. The cable drum is supported rotatable on its axis 4. At the other end of the cable drum 2 is arranged a drum brake 6 of the present invention. The drum brake 6 is activated to stop the cable drum 2 when the speed of the cable drum and thus the speed of the load hanging on the rope of the hoisting device exceeds a predetermined speed limit. In practice the speed limit of the peripheral velocity of the cable drum is 15–40 m/min.

Figure 2:
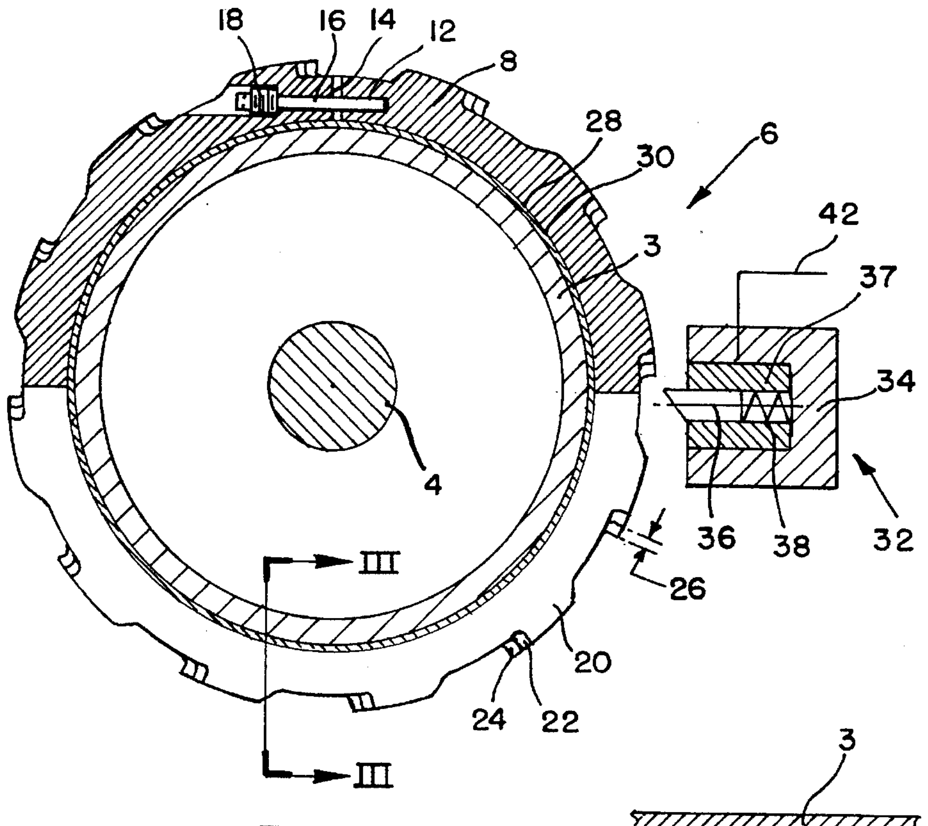
FIG. 2 is a cross sectional view of the safety mechanism of the present invention taken along lines 11—11 of FIG. 1.
Figure 3:
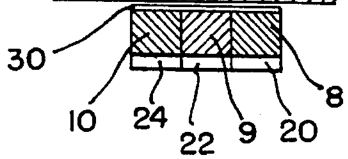
FIG. 3 is a cross sectional view taken along line 111—111 of FIG. 2.

FIG. 2 illustrates a cross sectional view along lines 11—11 in FIG. 1. The drum brake 6 consists of three ratchet wheels 8, 9 and 10 having teeth on their outer surface. The ratchet wheels encircle the brake drum 3, which is coaxial with the cable drum and connected to it or is a structural part of the cable drum. The ratchet wheels almost entirely surround the brake drum 3. Each ratchet wheel 8, 9, 10 is open and its end 12 are connected to its other end 14 with a screw 16. Between the screw 16 and the other end 14 of the ratchet wheel is installed a spring 18 to provide a suitable pressing force between the ratchet wheel 8 and the brake drum 3. Respectively the ends of the ratchet wheels 9 and 10 are connected together with screws. Each ratchet wheel 8, 9, 10 has teeth 20, 22 and 24 respectively on its outer cylinder surface and there are slots between the teeth in every ratchet wheel. The ratchet wheels are essentially similar and their teeth are divided in a similar way but the teeth of the ratchet wheel 8 are transferred a distance 26 from the teeth of the ratchet wheel 9 and further the teeth of the ratchet wheel 9 are transferred a distance 26 from the teeth of the ratchet wheel 10. The inner surface 28 of the ratchet wheel is lined with a brake lining 30. The other side of the lining 30 is against the brake drum 3. As illustrated in FIG. 3, which is a cross sectional view along line 111—111 of the FIG. 2, the ratchet wheels 8, 9 and 10 and their brake linings are parallel on the brake drum 2.

For triggering of the drum brake, a trigger mechanism 32 is arranged near the teeth of the ratchet wheels 8, 9, 10. The trigger mechanism 32 comprises a body part 34, a trigger member 36 installed movably therein and a spring 38. The trigger member 36 is kept by an electromagnet 37 in its inactivated position as shown in the FIG. 2. When the speed of the cable drum exceeds a predetermined speed limit which is detected e.g. by a tachometer 5 arranged on the axis 4 of the cable drum, the electromagnet 37 is released by a control unit 40 with a signal via a conductor 42 and the trigger member 36 is moved towards the ratchet wheels by the spring 38 and into the slots between teeth thus causing the stopping of the ratchet wheels. In the embodiment of FIG. 2 the ratchet wheel 10 will be stopped first and its brake lining begins to brake with a moment defined by the spring 18 of the ratchet wheel 10. At the triggering moment the braking moment will be a little greater because of the fact that the static moment is greater than the dynamic friction moment. After a delay the second ratchet wheel 9 will be locked and further after another delay the ratchet wheel 8 will be locked thus causing an increase of the braking moment when the braking surface increases. The delay depends on the phase difference of the ratchet wheels and the speed of the cable drum. The parts of the hoisting equipment, like the hoisting ropes, are dimensioned to bear a force which effects when a nominal load is decelerated from the said speed limit in a certain time. As this safety means is to fulfill this deceleration requirement the starting moment in the beginning of the braking will be always lower than the dimensioned moment because only a part of the braking moment is used in the beginning. However, the full moment will be reached almost immediately after triggering the brake. In a normal case the static, i.e. detaching moment is about 30–40% greater than the dynamic moment which is defined by the spring 18. The brake may be unused for a long time, even for years, and then the static moment can be much higher, even 70–120% greater than the dynamic moment because of corrosion or other age depending factors.

In a very advantageous embodiment of the invention, identical ratchet wheels are used forming a modular structure. The number of ratchet wheels is defined case by case according to the required braking moment.

The ratchet wheels can also differ from each other in their width and braking surface. Also, the springs of the ratchet wheels can be different and the phase difference between the parallel ratchet wheels may be adjustable. The number of the ratchet wheels and their structure may have several alternatives within the scope of the present invention.

The triggering mechanism can be actuated electrically or mechanically or other different ways depending on the speed of the cable drum or lifting rope. The embodiments of the invention may also differ from the above in other respects and the full scope is defined by the following claims.

I claim:

1. A safety mechanism for a crane to prevent a cable drum operated hoist from operating above a predetermined cable speed limit, comprising:

(a) a brake drum directly connected to the cable drum of the hoist, the brake drum being rotatable with the cable drum in a rotation direction;

(b) a plurality of ratchet wheels surrounding said brake drum and being substantially parallel in the axial direction of said brake drum;

(c) each of said ratchet wheels being lined with a brake lining interposed between the ratchet wheel and said brake drum, said ratchet wheels being fixed to and rotatable with said brake drum by the frictional force exerted by said brake linings on said brake drum;

(d) at least one stopping slot being provided at a periphery of each of said ratchet wheels, at least one of said stopping slots on one of the ratchet wheels being located forwardly in the rotation direction of the drum compared to at least one other stopping slot on another of the ratchet wheels; and (e) latching means insertable into at least one of said stopping slots for preventing rotation of the brake drum when said predetermined cable speed limit is exceeded, whereby said latching means initially engages the forward most ratchet wheel and subsequently engages at least one other ratchet wheel simultaneously therewith to apply increasing frictional force to said brake drum.

2. The safety mechanism as claimed in claim 1, wherein at least one of said plurality of ratchet wheels is comprised of one substantially circular part with a screw extending between ends of the substantially circular part, the screw holding the at least one ratchet wheel on said brake drum.

3. The safety mechanism as claimed in claim 1, wherein said latching means is inserted simultaneously into stopping slots of all said ratchet wheels.

4. The safety mechanism as claimed in claim 1, further comprising an electric trigger operatively connected to the latching means, the latching means being actuated by the electric trigger.

5. The safety mechanism as claimed in claim 1, wherein the plurality of ratchet wheels are identical, the ratchet wheels forming a modular structure.

6. The safety mechanism as claimed in claim 1, wherein a phase difference between the ratchet wheels is adjustable.

7. The safety mechanism as claimed in claim 1, wherein a plurality of stopping slots are provided on each of the plurality of ratchet wheels and wherein each stopping slot on one ratchet wheel is adjacent another stopping slot on an adjacent ratchet wheel.

8. The safety mechanism as claimed in claim 7, wherein three ratchet wheels are provided as the plurality of ratchet wheels, each of the ratchet wheels having a plurality of stopping slots, a middle ratchet wheel being located between the other two outer ratchet wheels, each of the ratchet wheels having corresponding stopping slot with corresponding stopping slots being adjacent to one another, each stopping slot on the middle ratchet wheel being located between corresponding stopping slots in the rotation direction of the two outer ratchet wheels, the corresponding stopping slots being staggered in the rotation direction.

9. The safety mechanism as claimed in claim 1, wherein three ratchet wheels are provided as the plurality of ratchet wheels, each of the ratchet wheels having a plurality of stopping slots, a middle ratchet wheel being located between the other two outer ratchet wheels, each of the ratchet wheels having corresponding stopping slots with corresponding stopping slots being adjacent to one another, each stopping slot on the middle ratchet wheel being located between corresponding stopping slots in the rotation direction of the two outer ratchet wheels, the corresponding stopping slots being staggered in the rotation direction.

10. The safety mechanism as claimed in claim 1, wherein the at least two of the plurality of ratchet wheels have stopping slots adjacent to one another, the adjacent stopping slots being staggered in the rotation direction.

11. The safety mechanism as claimed in claim 1, wherein each of the plurality of ratchet wheels have a generally circular shape with two ends connected by a screw, each of the screws being adjustable to vary tension at which the ratchets are held on the brake drum.

12. The safety mechanism as claimed in claim 1, wherein each of the at least one stopping slots have a tooth which is engagable by the latching means, each of the slots having a forward and rearward end relative to the rotation direction and the teeth being located at the rearward end of the slots.

* * * * *

UNITED STATES PATENT AND TRADEMARK OFFICE
CERTIFICATE OF CORRECTION

PATENT NO. : 5,458,318

DATED : October 17, 1995

INVENTOR(S) : Olavi JUSSILA

It is certified that error appears in the above-indentified patent and that said Letters Patent is hereby corrected as shown below:

On the title page, item [73] Assignee, please change the name of the Assignee from "Kone OY, Helsinki, Finland" to --KCI Konecranes International Corporation, Hyvinkää, Finland--

Signed and Sealed this

Fifth Day of March, 1996

Attest:

Bruce Lehman

BRUCE LEHMAN

Attesting Officer

*Commissioner of Patents and Trademarks*